UNITED STATES PATENT OFFICE.

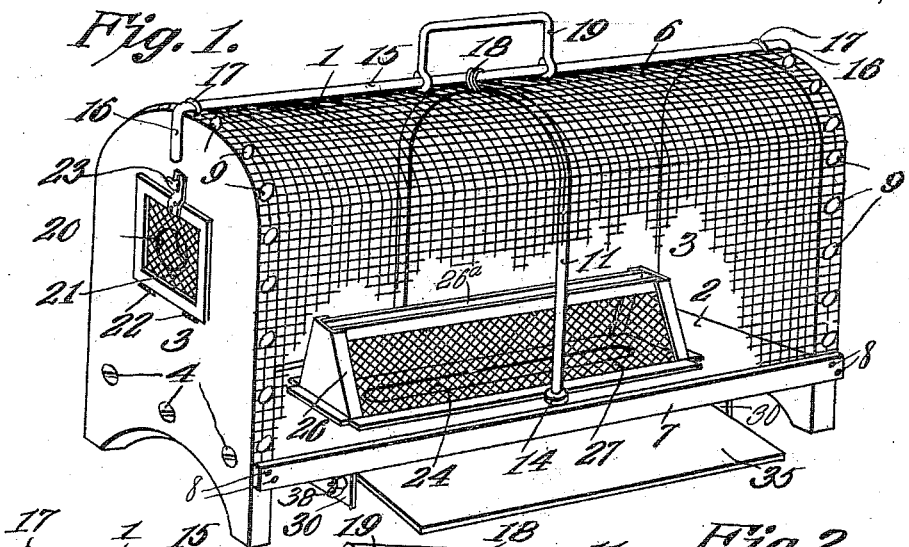

SAMUEL F. ROCKLEY, OF EUREKA, KANSAS.

FLY-TRAP.

985,840.  Specification of Letters Patent.  Patented Mar. 7, 1911.

Application filed September 23, 1910. Serial No. 583,505.

*To all whom it may concern:*

Be it known that I, SAMUEL F. ROCKLEY, a citizen of the United States, residing at Eureka, in the county of Greenwood and State of Kansas, have invented a new and useful Fly-Trap, of which the following is a specification.

This invention relates to fly traps.

The object of the invention is to simplify the general construction of such devices, and to provide novel means to entice flies to the bait-pan of the trap.

A further object of the invention is the provision of means for holding the bait-pan in various adjusted positions.

With the above and other objects in view, as will appear as the nature of the invention is better understood, the same consists in the novel construction and combination of parts of a fly trap, as will be hereinafter fully described and claimed.

In the accompanying drawings: Figure 1 is a perspective view of a fly trap constructed in accordance with the present invention. Fig. 2 is a longitudinal sectional view through the trap. Fig. 3 is a transverse sectional view through the trap. Fig. 4 is a perspective detail view, showing the means for holding the platforms leading to the trap in various adjusted positions.

Generally stated, the invention comprises a cage, and a trap embodying a bait-pan, the trap being arranged within the cage, and the pan exteriorly thereof.

Referring to the drawings, 1 designates a cage which consists of a bottom 2 and end pieces 3 the latter being secured to the bottom by screws 4. These end pieces are rounded at their upper ends, and extending over the same from one side of the bottom to the other is a wire mesh work 6 which provides an inclosure for the flies. This mesh work is secured to the bottom by means of straps 7 which are held in position by nails 8 and to the end pieces by tacks 9. The central portion of the mesh work is braced and held in contour by means of a brace wire member 11 each end of which passes through the bottom at 12, Fig. 3, and is bent at an angle at 13, there being a shoulder 14 above the bottom to prevent displacement of the member. Extending longitudinally and centrally of the cage, exteriorly above the mesh work, is a rod 15 each end of which is bent at an angle at 16 in order to engage the end pieces, staples 17 driven into the upper portion of the end pieces serving to hold the rod securely in place. The upper portion of the brace wire 11 and the center of the rod 15 are secured together. Carried by the rod 15 is a handle 19 which is preferably constructed from a length of wire as shown.

One of the end pieces is provided with an aperture 20 which is covered by a mesh work screen door 21 hinged at 22 to the end pieces, the door being provided with a catch 23 for holding it locked. This aperture is provided for the purpose of emptying the trap of dead flies as often as necessary.

The bottom is provided with an elongated slot 24 through which the flies pass after leaving the bait-pan. Secured to the upper face of the bottom is the trap which comprises a bait-pan, presently to be described, and an elongated truncated pyramidal framework 26, the side walls of which are spaced apart to provide a longitudinal orifice $26^a$ through which the flies pass after having entered the framework 26 through the slot 24, the framework being covered by a wire mesh 27.

The bait-pan which is disposed beneath the opening 24 is elongated in form and has its ends 30 provided with flanges 31 which are received in guides 32 secured to the under face of the bottom, the guides having spring latches 33 combined therewith to engage the flanges to hold the pan in place. Hinged to each side of the bait-pan is a platform 35 which is disposed upon an inclination so as to guide the flies to the bait-pan. The end flanges of the bait-pan are provided with circular openings 37 to be engaged by threaded pins $37^a$ projecting from the ends of the platforms, winged nuts engaging the pins serving to hold the platforms in adjusted position.

It will be seen from the foregoing description that although the trap of this invention is simple in construction, it will be thoroughly efficient for the purposes designed, and will not prove objectionable or unsightly in use.

What is claimed as new is:—

1. A fly trap comprising a cage having in its bottom an elongated opening, a trap arranged above the opening, a bait-pan arranged below the opening and provided with flanges, guides carried by the bottom to receive the flanges, and means for holding the pan in various adjusted positions.

2. A fly trap comprising a cage having in its bottom an elongated opening, a trap arranged above the opening, a bait-pan disposed below the opening and provided with flanges, guides carried by the bottom to receive the flanges, means for holding the pan in various adjusted positions, platforms hinged to the pan, and means for holding the platforms in adjusted positions.

In testimony that I claim the foregoing as my own, I have hereto affixed my signature in the presence of two witnesses.

SAMUEL F. ROCKLEY.

Witnesses:
CHAS. B. GILCHRIST,
WM. JOHNSTON.

Copies of this patent may be obtained for five cents each, by addressing the "Commissioner of Patents, Washington, D. C."